UNITED STATES PATENT OFFICE.

ALFRED STOCK, OF BRESLAU, GERMANY, ASSIGNOR TO CHEMISCHE FABRIK GRIESHEIM ELEKTRON, OF FRANKFORT-ON-THE-MAIN, GERMANY, A CORPORATION OF GERMANY.

PROCESS OF OBTAINING PURE PHOSPHORUS SESQUISULFID.

1,054,250.  Specification of Letters Patent.  Patented Feb. 25, 1913.

No Drawing.  Application filed October 10, 1910.  Serial No. 586,387.

*To all whom it may concern:*

Be it known that I, ALFRED STOCK, a subject of the German Emperor, and resident of Breslau, Germany, have invented certain new and useful Improvements in Processes of Obtaining Pure Phosphorus Sesquisulfid, of which the following is a specification.

This invention relates to the production of pure phosphorus sesquisulfid ($P_4S_3$): and it comprises a process of purification wherein the crude and impure sulfid obtained by melting phosphorus and sulfur together is purified from other sulfids, and more particularly from the higher sulfids, by treatment with water particularly with hot water or water in the form of steam.

The phosphorus sesquisulfid ($P_4S_3$), which is valuable for use in the manufacture of matches is obtained by melting together phosphorus and sulfur. Other sulfids, however, are also formed, and are present as impurities, particularly the higher sulfids $P_4S_7$ and $P_4S_{10}$. According to the processes heretofore practised the sesquisulfid has been obtained in a still impure condition and with a correspondingly low melting point.

I have discovered that pure phosphorus sesquisulfid ($P_4S_3$) can be obtained by treating the raw or crude product with water particularly in a heated condition or in the form of steam. The sesquisulfid I have found to be very stable in water, even at the boiling point, while other higher sulfids present as impurities ($P_4S_7$ and $P_4S_{10}$) are decomposed and can be thus removed. These sulfids are always formed when phosphorus and sulfur are heated together in proportions to give $P_4S_3$ (Stock *Ber.* 42 (1909) 2062; 43 (1910) 150, 414, 1226). Accordingly I have found that the sesquisulfid can be easily separated from the impurities and obtained in a state of remarkable purity as is indicated by its melting point, 171°–172° C. The decomposition of the two higher sulfids takes place according to the equations:

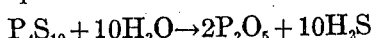
$$P_4S_{10} + 10H_2O \rightarrow 2P_2O_5 + 10H_2S$$

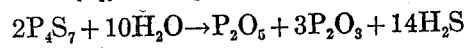
$$2P_4S_7 + 10H_2O \rightarrow P_2O_5 + 3P_2O_3 + 14H_2S$$

The treatment with water is effected in a very short time if hot water or steam is used, and a pure product thus readily obtainable. It differs from the impure products hitherto known in that it is much more stable, being but little decomposed by pure water, or by exposure to the air.

I claim:

1. The process of producing pure phosphorus sesquisulfid which comprises treating the crude impure sulfid, and decomposing the higher sulfids present as impurities, with water.

2. The process of producing pure phosphorus sesquisulfid which comprises treating the crude impure sulfid, and decomposing the higher sulfids present as impurities with hot water.

3. The process of producing pure phosphorus sesquisulfid which comprises treating the crude impure sulfid, and decomposing the higher sulfids present as impurities with water in the form of steam.

In testimony whereof I have signed my name to this specification in the presence of two subscribing witnesses.

ALFRED STOCK.

Witnesses:
 FRANS FISCHER,
 CLARA BENDIG.